United States Patent
Bader et al.

(10) Patent No.: US 6,827,858 B2
(45) Date of Patent: Dec. 7, 2004

(54) METHOD FOR SEPARATING ALKALI METAL IONS FROM ALKOXYLATES

(75) Inventors: Joachim Bader, Bobenheim-Roxheim (DE); Hans-Heinrich Bechtolsheimer, Dittelsheim-Hessloch (DE); Armin Brucker, Neustadt (DE); Toni Dockner, Meckenheim (DE); Gabriele Iffland, Heidelberg (DE); Hans Klink, Hessheim (DE); Stefan Martin, Dolgesheim (DE); Jürgen Mohr, Gruenstadt (DE); Hans-Martin Mugrauer, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 91 days.

(21) Appl. No.: 10/275,942

(22) PCT Filed: May 16, 2001

(86) PCT No.: PCT/EP01/05600

§ 371 (c)(1),
(2), (4) Date: Nov. 14, 2002

(87) PCT Pub. No.: WO01/88016

PCT Pub. Date: Nov. 22, 2001

(65) Prior Publication Data

US 2003/0150814 A1 Aug. 14, 2003

(30) Foreign Application Priority Data

May 17, 2000 (DE) .......................................... 100 24 313

(51) Int. Cl.[7] .................................................. C02F 1/42

(52) U.S. Cl. ........................ 210/669; 210/670; 210/673; 210/674

(58) Field of Search ................................ 210/660, 663, 210/669, 670, 673, 674; 536/18.6; 568/870

(56) References Cited

U.S. PATENT DOCUMENTS

| 4,985,551 A | * | 1/1991 | Perry et al. ................. 536/18.6 |
| 4,994,627 A | | 2/1991 | Cuscurida et al. |
| 5,182,025 A | | 1/1993 | Duranleau et al. |

FOREIGN PATENT DOCUMENTS

| EP | 0 376 157 | 7/1990 | |
| GB | 835 553 | 5/1960 | |
| GB | 2 135 322 | 8/1984 | |
| JP | 01258749 A | * 10/1989 | .................. 521/26 |

* cited by examiner

Primary Examiner—Robert A Hopkins
(74) Attorney, Agent, or Firm—Oblon, Spivak, McClelland, Maier & Neustadt, P.C.

(57) ABSTRACT

Alkali metal ions are separated off from alkoxylates containing alkali metal ions by a process comprising:
  a) dilution of the alkali metal-containing alkoxylate with an inert solvent,
  b) treatment of the alkali metal-containing solution of the alkoxylate with a cationic exchanger in order to obtain a substantially alkali metal-free solution of the alkoxylate, and
  c) removal of the solvent from the substantially alkali metal-free solution of the alkoxylate in order to obtain a substantially alkali metal-free and substantially solvent-free alkoxylate.

8 Claims, 2 Drawing Sheets

METHOD FOR SEPARATING ALKALI METAL IONS FROM ALKOXYLATES

Figure 1:
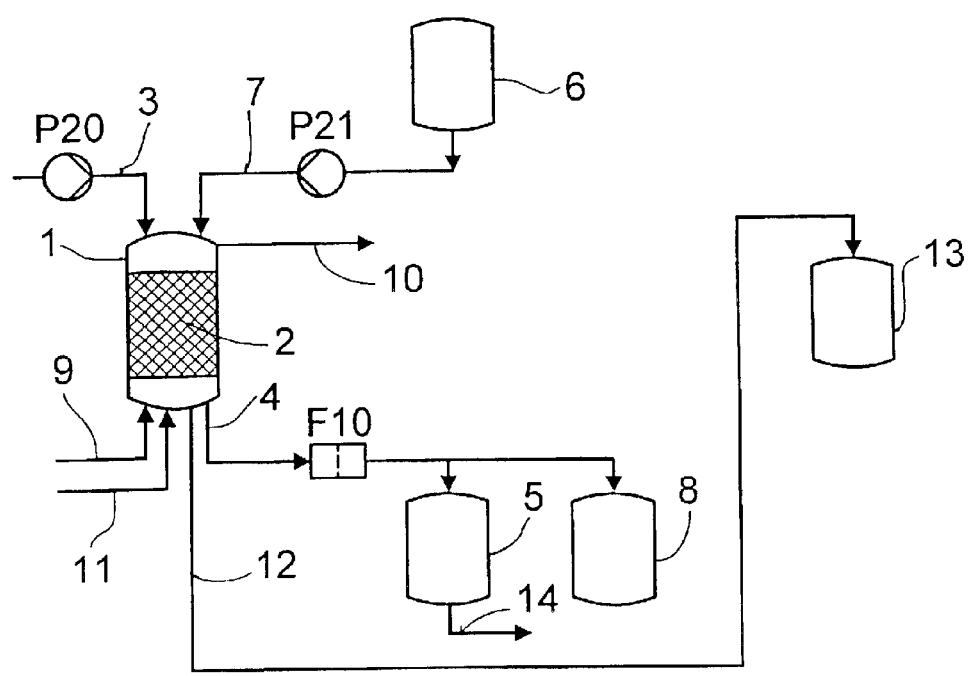

The present invention relates to a process for separating alkali metal ions from alkoxylates containing alkali metal ions, alkali metal-free alkoxylates and a process for the preparation of alkali metal-free alkoxylates.

Alkoxylates, in particular polyalkylene oxides and adducts of alkylene oxides with alcohols and/or alkylphenols, are usually prepared under alkali metal hydroxide catalysis. Depending on the intended use, it is frequently necessary to remove the catalyst as completely as possible from the adduct. This is the case, for example, with alkoxylates which are used as fuel additives or carrier oils in fuel additive packets or formulations. Such alkoxylates for carrier oils are in general adducts of propylene oxide and/or butylene oxide with alcohols and/or alkylphenols of more than 6 carbon atoms, which are prepared by catalysis using potassium hydroxide. In order to ensure substantially residue-free combustibility of the carrier oils, the catalyst must be separated off. In the conventional processes, this is done by neutralization and precipitation as acidic potassium phosphate and subsequent filtration. After the synthesis of the alkoxylates, also referred to here generally as polyethers, it is therefore necessary to neutralize the potassium alcoholate contained in the product with dilute phosphoric acid (stoichiometric amounts of phosphoric acid dissolved in about 10%, based on the reactor content, of water) and to distill off the water for crystallization of the acidic potassium phosphate. The reactor content must then be filtered, for example through a batchwise sheet filter, which is manually loaded and scraped off. Further required steps are the separation and separate packing of product-moist salt and impregnated filter sheets, their transport and incineration; the cleaning of the reactors before the subsequent batch, also in the case of a batch procedure, in order to remove remaining phosphate residues which neutralize marked amounts of catalyst and can thus delay or even suppress initiation of the oxyalkylation reaction; the drying of the reactors for the subsequent batch. It is clear that the removal of the catalyst is expensive. Moreover, the carrier oils thus obtained still contain small amounts of potassium and also phosphorus, so that residue-free combustion of the carrier oils is not possible.

It is an object of the present invention to provide alkoxylates which are substantially free of catalyst impurities from the preparation.

It is a further object of the present invention to provide a process for the preparation of alkoxylates which are substantially free of catalyst impurities from the preparation.

It is a further object of the present invention to provide a process for separating the catalyst from alkoxylates, which permits substantial removal of the catalyst from the product and preferably avoids contamination of the product with phosphate.

We have found that this object is achieved by the novel process for the separation of alkali metal ions from alkoxylates containing alkali metal ions (in particular potassium and sodium ions), which comprises the following steps:

a) dilution of the alkali metal-containing alkoxylate with an inert solvent, b) treatment of the alkali metal-containing solution of the alkoxylate with a cation exchanger for exchanging alkali metal ions for hydrogen ions in order to obtain a substantially alkali metal-free solution of the alkoxylate, and c) removal of the solvent from the substantially alkali metal-free solution of the alkoxylate in order to obtain a substantially alkali metal-free and substantially solvent-free alkoxylate.

In the novel process for the preparation of alkoxylates, the alkoxylates are initially prepared in a conventional manner, and the catalyst is then removed by the novel process for separating off alkali metal.

The term alkali metal-free or substantially alkali metal-free means that less than 5, preferably less than 1, ppm of alkali metal ions are present. The alkali metal-containing alkoxylate to be purified generally contains from 5 000 to 100, in particular from 2 000 to 1 000, ppm of alkali metal ions.

The term substantially solvent-free means that the alkoxylate contains <1 000, preferably <500, ppm of solvent.

The term alkoxylate includes pure substances as well as mixtures which are obtained using different alkylene oxides and/or different alcohols.

The term alkoxylate includes polyalkylene oxides (polyethers) and alcohol- and/or alkylphenol-initiated polyethers. The polyether or the polyether moiety of the alcohol- and/or alkylphenol-initiated polyethers is generally composed of at least one $C_2$–$C_6$-alkylene oxide, in particular ethylene oxide, propylene oxide, n-butylene oxide, 2,3-butylene oxide and/or isobutylene oxide. In general, at least one $C_1$–$C_{50}$-alkanol, preferably $C_2$–$C_{20}$-alkanol, particularly preferably $C_6$–$C_{14}$-alkanol, in particular 2-ethylhexanol, nonanol, isononanol, tridecanol, isotridecanol, etc., is used as the alcohol. The alkylphenol used is in general a $C_1$–$C_{50}$-alkylphenol, particularly preferably a $C_6$–$C_{14}$-alkylphenol, preferably a $C_6$–$C_{14}$-alkylphenol, in particular nonylphenol, octylphenol or dodecylphenol, or a di-$C_1$–$C_{50}$-alkylphenol.

Alkanol-initiated polyethers having from about 10 to 35, preferably from about 15 to 30, alkylene oxide units are preferred.

The preparation of alkoxylates is known per se. Polyether syntheses are described, for example, in Ullmann's Encyclopedia of Industrial Chemistry, 5th Edition, Vol. 21, 1992, 579–589, and the publications stated therein. The preparation of alcohol- or alkylphenol-initiated polyethers is described, for example, in Ullmann's Enzyklopädie der technischen Chemie, 4th Edition, Volume 22, 491–492 and Volume 19, 31–33.

The catalyst-containing crude alkoxylate product is initially diluted with an inert solvent for removal of the catalyst. Solvents used are in general an aliphatic or cyclic ether, such as tert-butyl methyl ether, tetrahydrofuran or dioxane, a hydrocarbon, such as pentane, hexane, toluene or xylene, a ketone, such as acetone or methyl ethyl ketone, and preferably an alcohol, in particular a $C_1$–$C_4$-alkanol, such as ethanol, isopropanol, n-butanol, isobutanol and preferably methanol. For removal of the alkali metal catalyst, the dilute solution is treated with a cation exchanger, for example is passed through an exchanger bed, in particular in the form of a column, or is stirred with the cation exchanger. Particularly suitable cation exchangers are strongly acidic, macroporous resins, for example those based on crosslinked polystyrenes having sulfonic esters as functional groups.

The amount of cation exchanger required for removal of the catalyst is dependent on the catalyst content of the product to be treated and on the capacity of the ion exchanger used.

The solvent is then removed again, for example by distilling off. The removal is preferably effected in two steps. In a first step, the main amount of the solvent is removed, preferably by distilling off, an alkoxylate solution depleted of solvent and the solvent being obtained. In the first step, preferably at least 80% and up to 95% of the solvent are removed. In a second step, the remaining amount of the solvent is removed, preferably by stripping the depleted solution of the alkoxylate with inert gas in a column, in order to obtain a substantially alkali metal-free and substantially solvent-free alkoxylate and alcohol.

After a specific operating time, the cation exchanger needs to be regenerated. The regeneration is preferably integrated in the overall process, i.e. alkoxylate solution still contained in the cation exchanger is recovered before the regeneration and is recycled to stage c) or a) of the catalyst separation process. Any residues of the alkoxylate solution which still adhere to the cation exchanger are removed by washing with the inert solvent. The wash solvent is likewise recycled to stage a) of the catalyst separation process.

The regeneration of the cation exchanger preferably comprises the following steps:

d1) removal of the alkoxylate solution from the cation exchanger and, if required, washing of the cation exchanger with the inert solvent; this can be effected in such a way that the alkoxylate solution is removed, for example by discharging, and the cation exchanger is then washed with the solvent; alternatively the solvent can be fed in without prior removal of the alkoxylate solution, until the alkoxylate has been washed out, d2) if required, washing of the cation exchanger with demineralized water, d3) regeneration of the cation exchange resin with an acid, preferably sulfuric acid, d4) washing the cation exchange resin neutral with demineralized water, d5) washing out the water present in the ion exchanger resin with an inert solvent, preferably a water-miscible inert solvent, and d6) if required, loading of the cation exchanger with the inert solvent desired for the treatment with the cation exchanger.

The inert solvent used in the regeneration of the cation exchanger is preferably the same as that also used in the catalyst separation process. Step d6) is then omitted.

Preferably, the alkoxylate adducts are stripped with steam or an inert gas, such as nitrogen, after the synthesis, i.e. before step a) of the novel process.

The present invention can be particularly advantageously used for separating potassium ions from adducts of ethylene oxide and/or propylene oxide and/or butylene oxide, in particular propylene oxide and/or butylene oxide, with $C_6$–$C_{14}$-alcohols and/or $C_6$–$C_{14}$-alkylphenols, the inert solvent used preferably being a $C_1$–$C_4$-alkanol, in particular methanol.

A preferred embodiment of the present invention is described below. The stated amounts of solvent/diluent and temperature ranges are preferred values for separating potassium from propylene oxide/butylene oxide adducts using methanol as a diluent. They may assume different values in the case of other adducts, catalysts and solvents, but the optimum values can be readily determined by a person skilled in the art using routine methods.

For dilution of the potassium-containing adduct (step a), preferably from 5 to 25, particularly about 15, % (m/m) of methanol are added to the adduct. The methanolic solution is then treated with a cation exchanger, for example is passed over an ion exchanger bed which contains a cation exchanger. It is possible to use a commercial ion exchange resin, preferably in granular form. For example, the above-mentioned ion exchangers, for example Lewatit SP 120 (Bayer) and Amberlite 252 C (Rohm and Haas), are suitable.

The service life of the cation exchanger is in general 1 year or longer. On passing through the ion exchanger, the methanolic solution is preferably at from about 20 to 60° C., particularly preferably about 50° C. The cation exchanger is present in the acidic form. During the passage of the potassium-containing methanolic solution of the adduct it binds potassium ions and releases protons according to the following equation:

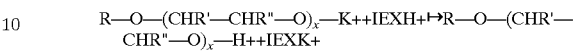

R—O—(CHR'—CHR"—O)$_x$—K++IEXH+↔R—O—(CHR'—CHR"—O)$_x$—H++IEXK+

IEX=ion exchanger
R=alkyl or alkylaryl
R'=R"=H, $CH_3$, $C_2H_5$

After the treatment with the cation exchanger, the methanolic adduct solution is greatly depleted of potassium, in particular substantially potassium-free, and particularly preferably the concentration of the potassium ions is not more than 1 ppm.

For separating off possible fine fractions of the ion exchange resin, the solution is then filtered in a conventional manner. Before the further treatment, it may be temporarily stored in a container.

It is advisable for the potassium content of the adduct solution leaving the ion exchanger to be monitored continuously or at least at regular intervals by means of analytical measurement. In the event of a breakthrough of potassium ions the exchanger must be regenerated. This is done by means of an acid, preferably sulfuric acid, particularly preferably about 5% strength sulfuric acid, by the following procedure:

First, the feed stream of the potassium-containing methanolic solution of the adduct to the ion exchanger is stopped. Then, methanol can be fed in in order to wash the ion exchanger product-free. Adduct-containing methanol, which in turn is used for diluting the crude product, i.e. the catalyst-containing alkoxylate, is obtained. However, before the washing with methanol, the potassium-free adduct solution still present in the ion exchanger is preferably forced out of the ion exchanger with nitrogen or another inert gas and is combined with the other potassium-free adduct solution for the further treatment. The ion exchanger is then washed product-free with methanol, and the wash methanol leaving the ion exchanger and containing a small amount of adduct is used for diluting the potassium-containing crude product. Preferably, the wash or rinse methanol is also preferably filtered to separate off possible fine fractions of the ion exchange resin before being used further.

The potassium-laden ion exchanger is now full of methanol, which has to be removed before the regeneration. One possible method is to wash the ion exchanger with demineralized water by the countercurrent or cocurrent method. The methanol-containing wastewater obtained here is not used further but is disposed of via a wastewater treatment plant. In order to avoid relatively large losses of methanol, it is, however, preferable to remove the methanol, for example to force it out of the ion exchanger by means of an inert gas, such as nitrogen, before washing the ion exchanger with demineralized water. This methanol is preferably combined with the other, adduct-containing rinse methanol and is used again for diluting subsequent batches of potassium-containing adducts.

The ion exchanger is then converted back into the acidic form by passing through dilute sulfuric acid (1 to 20% by weight), preferably about 5% strength sulfuric acid, by the countercurrent method. This is followed by washing neutral with demineralized water, and the water is finally washed out with methanol, preferably by the trickle-bed procedure. The resulting aqueous methanol phase can be used instead of fresh methanol for preliminary cleaning of reactors on product change.

After complete replacement of the water by methanol, the ion exchanger is ready for operation again and can be loaded again.

The substantially potassium-free adduct solution leaving the ion exchanger is further treated as follows:

For reasons relating to application technology, the solution must be freed from the solvent as completely as possible. This is preferably carried out in an evaporator unit, in particular a single-stage one, with connected stripping column. The preferred temperature range is from about 150 to 170° C., particularly preferably 160° C. First, the main amount of the methanol, preferably at least 80%, is separated off by distillation. The recovered methanol can be collected and reused.

In particular an inert gas stripping column in which the concentration is reduced to methanol contents of less than 1 000 ppm, preferably less than 500 ppm, is used for removing the remaining methanol from the adduct solution. The inert gas is preferably nitrogen.

The methanol stripped off in the stripping column can also be reused. The substantially potassium-free desired products having a low methanol content and leaving the stripping column are preferably passed through a heat exchanger, where they preheat the adduct solution having a low potassium content, before entry into the evaporator apparatus and are themselves cooled to about 50 to 60° C.

The novel process comprises a plurality of process steps in which pure methanol is required, i.e. in washing the ion exchanger free of product, in washing the water out of the ion exchanger and in filling the ion exchanger with methanol after the regeneration and, if required, for diluting the crude product prior to separating off the potassium in the ion exchanger. The methanol distilled off and stripped off is preferably reused for this purpose. For diluting the potassium-containing crude product, adduct-containing methanol from the washing out of the ion exchanger is preferably additionally or exclusively reused.

Figure 2:
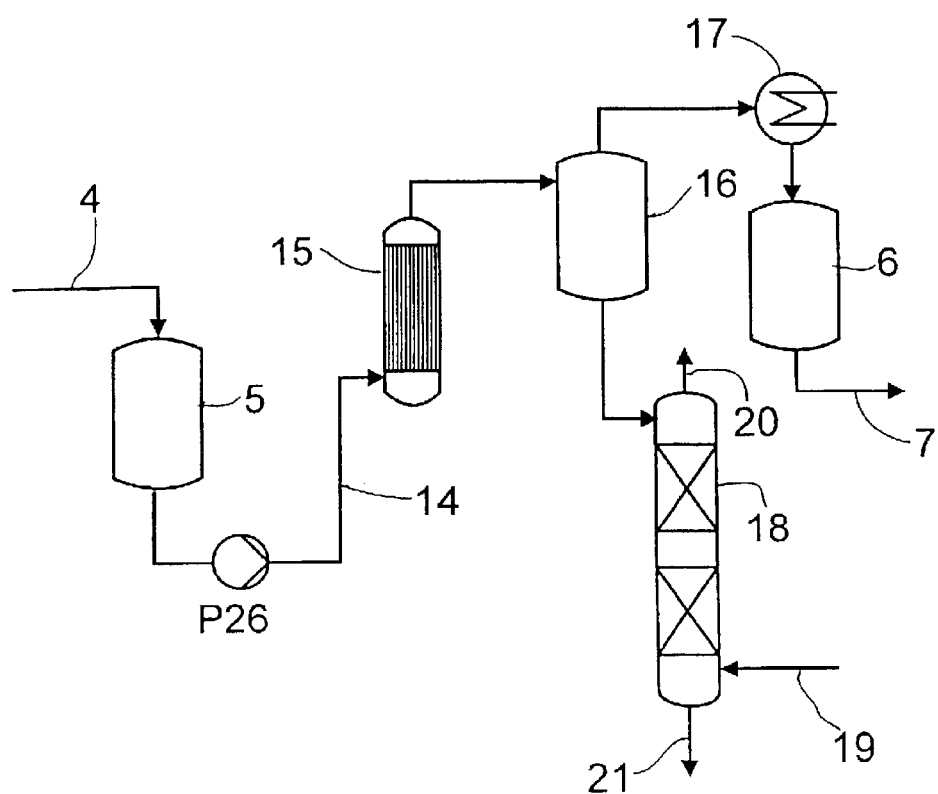

In the drawings:

FIG. 1 shows a flow diagram of an ion exchange unit as used for carrying out the novel process and FIG. 2 shows a flow diagram of an evaporator unit downstream of the ion exchange unit and intended for separating off the diluent methanol.

The invention is described in detail on the basis of a particularly preferred embodiment with reference to the figures.

As can be seen in FIG. 1, the crude, potassium-containing, methanol-diluted alkoxylates (butylene oxide adduct with isotridecanol) are transported via the line 3 by means of the pump P20 over a cation exchanger bed 2 in the container 1. In the container, an ion exchange resin is installed between two sieve plates. The ion exchanger is initially present in acidic form and binds potassium ions with release of protons. The dilution of the alkoxylates with methanol is necessary in order to achieve substantially complete cation exchange. The methanol-diluted alkoxylates entering the container 1 have a temperature of about 50° C.

The alkoxylate solution emerging from the container 1 via line 4 is substantially potassium-free. It passes through the filter F10 for separating off possible fine fractions of the exchange resin and is then temporarily stored in the container 5.

By analytical measurement, the alkoxylate stream leaving the container 1 is constantly monitored for freedom from potassium. In the event of a breakthrough of potassium ions, the exchanger must be regenerated. This is done using about 5% strength sulfuric acid by the following procedure:

The feed stream of the crude alkoxylate to the container 1 is stopped; the methanol-diluted alkoxylate still remaining in the exchanger container is then forced into the container 5 by means of nitrogen. The ion exchanger in the container 1 is then washed product-free with methanol, which is transported from container 6 via line 7 with the pump P21; the container 1 is then emptied again by forcing in nitrogen. The resulting, alkoxylate-containing rinse methanol passes through the filter F10 into the container 8 and is used again for diluting subsequent batches of the crude alkoxylates in the reactors of the synthesis plant.

After replacement of the alkoxylate in the ion exchanger by methanol, the container 1 is emptied as completely as possible into the container 8, and the ion exchange resin is then washed by the countercurrent method with demineralized water, which is fed in via line 9. The resulting wastewater which still contains methanol in the initial fractions is disposed of via line 10.

After a pure water phase is present in the container 1, the regeneration of the laden ion exchange resin is carried out by passing through about 5% strength sulfuric acid by the countercurrent method via line 11. The ion exchanger is converted back into the acidic form, and a dilute solution of potassium sulfate, potassium bisulfate and sulfuric acid leaves the container 1 and is disposed of via line 10.

After complete regeneration, the ion exchanger fill is washed acid-free with demineralized water via line 9, the container 1 is then again emptied as completely as possible and residual water is replaced by methanol. The methanol required for this purpose is transported by means of the pump P21 from the container 6.

The aqueous methanol phases obtained in this process step are transferred via line 12 into the container 13 and temporarily stored and are used in the synthesis of the alkoxylates instead of fresh methanol for preliminary cleaning of reactors on product change.

After complete replacement of the water by methanol, the ion exchanger in the container 1 is ready for operation again and can be loaded again with methanolic alkoxylate solutions via the pump P20.

The methanol-containing and substantially potassium-free alkoxylates temporarily stored in the container 5 are then freed as completely as possible from the solvent.

This is done in a downstream single-stage evaporator unit with subsequent nitrogen stripping column at about 160° C. (FIG. 2):

Substantially potassium-free alkoxylate solution is transported from the container 5 by means of the pump P26 via line 14 into the forced-circulation evaporator 15, with which the evaporator reboiler 16 is coordinated. The methanol is partially separated off by a procedure in which the vapor of the evaporator reboiler 16 is condensed in the condenser 17 and is collected in the methanol container 6.

From the evaporator reboiler 16, the alkoxylated depleted of methanol and at about 160° C. is fed to the top of the column 18 and is stripped countercurrently with nitrogen, which is fed in via line 19.

The waste gas leaving the column 18 via line 20 is disposed of after separating off condensable fractions (methanol), which are likewise collected in the container 6.

From the bottom of column, substantially methanol-free alkoxylate is taken off via line 21 and is used or stored.

The novel ion exchange process has the following advantages over the phosphate precipitation process of the prior art:

After the synthesis of the alkylene oxide adducts with alcohols by catalysis with potassium hydroxide, a number of process steps are omitted:

neutralization of the potassium alcoholate with dilute phosphoric acid and distilling off the water for crystallization of the acidic potassium phosphate, filtration of the reactor content through a batchwise sheet filter which is manually loaded and scrapped off, separation and separate packing of product-moist salt and impregnated filter sheets and transport for residue incineration, cleaning of the reactors before the subsequent batch, also in the batch procedure, in order to remove remaining phosphate residues which neutralize marked amounts of catalyst and can thus delay or suppress initiation of the oxyalkylation reaction, drying of the reactors for the subsequent batch, in the novel process in combination with the catalyst preparation of this lot.

The novel process permits economically and environmentally friendly purification of alkoxylates, in particular of carrier oils, at least to products of high quality. The novel ion exchange process gives carrier oils which undergo combustion without residues in the engine and have no emissions of additional foreign substances. Moreover, the novel process permits a capacity increase, which is substantially due to the fact that the reactors are available exclusively for the process of the synthesis of the alkylene oxide adducts.

We claim:

1. A process for separating alkali metal ions from alkoxylates containing alkali metal ions, comprising:

a) dilution of the alkali metal-containing alkoxylate with an inert solvent for the alkoxylate to form a solution, b) treatment of the alkali metal-containing solution of the alkoxylate with a cationic exchanger comprising a cation exchange resin in order to obtain a substantially alkali metal-free solution of the alkoxylate, and c) removal of the solvent from the substantially alkali metal-free solution of the alkoxylate in order to obtain a substantially solvent-free alkoxylate containing less than 5 ppm alkali metal ions, which process includes a regeneration of the cation exchanger, the regeneration comprising the following steps:

d1) removal of the alkoxylate solution from the cation exchanger and washing out the cation exchanger with an inert solvent, which inert solvent has the cap ability of forming a solution of the alkoxylate, d2) optionally washing out the cation exchanger with demineralized water, d3) regeneration of the cation exchange resin with an acid, d4) washing the cation exchange resin neutral with demineralized water, d5) washing out the water present in the ion exchange resin with an inert solvent and d6) optionally loading of the cation exchanger with the inert solvent desired for the treatment with the cation exchanger, wherein in step d1) the alkoxylate solution is removed from the cation exchanger by forcing it out by means of an inert gas.

2. A process as claimed in claim 1, wherein the removal of the solvent is effected in two steps, wherein firstly c1) the main amount of the solvent is removed in order to obtain an alkoxylate solution depleted of solvent and then c2) the remaining amount of the solvent is removed from the alkoxylate solution depleted of the solvent, in order to obtain a substantially alkali metal-free and substantially solvent-free alkoxylate.

3. A process as claimed in claim 2, wherein the solvent is distilled off in step c1) and/or the remaining amount of the solvent is removed by stripping with inert gas in step c2).

4. A process as claimed in claim 1, wherein the alkoxylate is an adduct of ethylene oxide and/or propylene oxide and/or butylene oxide with at least one $C_1$–$C_{50}$-alkanol and/or at least one ($C_1$–$C_{50}$-alkyl) phenol.

5. A process as claimed in claim 1, wherein the alkali metal ions to be separated off are potassium ions.

6. A process as claimed in claim 1, wherein the solvent used for diluting the alkoxylate and/or in the regeneration of the cation exchanger is a $C_1$–$C_4$-alkyl alcohol.

7. A process as claimed in claim 1, wherein, in step b), an alkoxylate solution having an alkali metal content of not more than 1 ppm is obtained.

8. A process as claimed in claim 6, wherein the solvent is methanol.

* * * * *